US012293727B2

(12) United States Patent
Kim et al.

(10) Patent No.: US 12,293,727 B2
(45) Date of Patent: May 6, 2025

(54) DEGRADATION COMPENSATOR, DISPLAY DEVICE HAVING THE SAME, AND METHOD FOR COMPENSATING IMAGE DATA OF THE DISPLAY DEVICE

(71) Applicant: Samsung Display Co., Ltd., Yongin-si (KR)

(72) Inventors: Hyo Min Kim, Yongin-si (KR); Gi Na Yoo, Yongin-si (KR); Sun Jin Joo, Yongin-si (KR); Ill Soo Park, Yongin-si (KR); Jae Hong Kim, Yongin-si (KR); Si Jin Sung, Yongin-si (KR); Jae Yong Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/120,976

(22) Filed: Mar. 13, 2023

(65) Prior Publication Data

US 2023/0230549 A1 Jul. 20, 2023

Related U.S. Application Data

(62) Division of application No. 16/354,048, filed on Mar. 14, 2019, now Pat. No. 11,636,812.

(30) Foreign Application Priority Data

Apr. 27, 2018 (KR) ........................ 10-2018-0049063

(51) Int. Cl.
*G09G 3/3275* (2016.01)
*G09G 3/20* (2006.01)

(52) U.S. Cl.
CPC ......... *G09G 3/3275* (2013.01); *G09G 3/2003* (2013.01); *G09G 2320/045* (2013.01)

(58) Field of Classification Search
None
See application file for complete search history.

(56) References Cited

U.S. PATENT DOCUMENTS 9,989,818 B2 * 6/2018 Jeon .................. G02F 1/134336
9,997,104 B2 6/2018 Zhang et al.
2005/0259886 A1 * 11/2005 Shan ......................... G06T 5/20
348/E5.076

(Continued)

FOREIGN PATENT DOCUMENTS

| | | |
|---|---|---|
| JP | 2010-191311 | 9/2010 |
| KR | 10-2010-0068106 | 7/2010 |
| KR | 10-2016-0137216 | 11/2016 |

OTHER PUBLICATIONS

Extended European Search Report issued on Aug. 29, 2019, in European Patent Application No. 19171331.2.

(Continued)

*Primary Examiner* — Amare Mengistu
*Assistant Examiner* — Sarvesh J Nadkarni
(74) *Attorney, Agent, or Firm* — CANTOR COLBURN LLP

(57) ABSTRACT

A degradation compensator including a compensation factor determiner configured to determine a compensation factor based on a distance between adjacent sub-pixels, and a data compensator configured to apply the compensation factor to a stress compensation weight to generate compensation data for compensating image data.

13 Claims, 12 Drawing Sheets

(56) References Cited

U.S. PATENT DOCUMENTS

| | | | | |
|---|---|---|---|---|
| 2008/0123022 | A1 | 5/2008 | Aoki et al. | |
| 2009/0295423 | A1 | 12/2009 | Levey | |
| 2011/0037774 | A1* | 2/2011 | Chen | G09G 3/006 345/589 |
| 2011/0074750 | A1 | 3/2011 | Leon et al. | |
| 2016/0343301 | A1 | 11/2016 | Choi et al. | |
| 2017/0076661 | A1 | 3/2017 | Zhang et al. | |
| 2017/0345377 | A1* | 11/2017 | Oh | G09G 3/3291 |
| 2019/0163006 | A1* | 5/2019 | Lu | G02F 1/134336 |

OTHER PUBLICATIONS

Non-Final Office Action mailed Jan. 28, 2021, in U.S. Appl. No. 16/354,048.
Non-Final Office Action mailed Jul. 7, 2021, in U.S. Appl. No. 16/354,048.
Final Office Action mailed Jan. 5, 2022, in U.S. Appl. No. 16/354,048.
Non-Final Office Action mailed Jul. 15, 2022, in U.S. Appl. No. 16/354,048.
Notice of Allowance issued Dec. 21, 2022, in U.S. Appl. No. 16/354,048.

* cited by examiner

LUT

| ORD | CDF |
|---|---|
| OR_min | 0.75 |
| OR1 | 0.76 |
| OR2 | 0.81 |
| ⋮ | ⋮ |
| RORD | 1 |
| ORk | 1.09 |
| ⋮ | ⋮ |
| OR_MAX | 1.52 |

DEGRADATION COMPENSATOR, DISPLAY DEVICE HAVING THE SAME, AND METHOD FOR COMPENSATING IMAGE DATA OF THE DISPLAY DEVICE

CROSS REFERENCE TO RELATED APPLICATIONS

This application is a Divisional of U.S. patent application Ser. No. 16/354,048, filed on Mar. 14, 2019, which claims priority from and the benefit of Korean Patent Application No. 10-2018-0049063, filed on Apr. 27, 2018, each of which is hereby incorporated by reference for all purposes as if fully set forth herein.

BACKGROUND

Field

Exemplary embodiments of the invention relate generally to display devices and, more specifically, to a degradation compensator, a display devices having the same, and methods for compensating image data of the display devices.

Discussion of the Background

In a display device, such as an organic light emitting display device, a luminance deviation and an afterimage may be generated on an image due to degradation (or deterioration) of pixels or organic light emitting diodes. As such, compensation of the image data is generally performed to improve the display quality.

Since the organic light emitting diode uses a self-luminescent organic fluorescent material, deterioration of the material itself may occur that decreases the luminance with the passage of time. Thus, a display panel may have a decreased lifetime due to the reduction of luminance.

A display device may accumulate age data (e.g., stress or degradation degree) for each pixel to compensate for deterioration and afterimage, and compensates for stress based on the accumulated data. For example, the stress information may be accumulated based on a current flowing through each sub-pixel, an emission time, and the like for each frame.

The above information disclosed in this Background section is only for understanding of the background of the inventive concepts, and, therefore, it may contain information that does not constitute prior art.

SUMMARY

Devices constructed according to exemplary embodiments of the invention are capable of compensating image data of the display devices.

Additional features of the inventive concepts will be set forth in the description which follows, and in part will be apparent from the description, or may be learned by practice of the inventive concepts.

A degradation compensator according to an exemplary embodiment includes a compensation factor determiner configured to determine a compensation factor based on a distance between adjacent sub-pixels, and a data compensator configured to apply the compensation factor to a stress compensation weight to generate compensation data for compensating image data.

The distance between the sub-pixels may be the shortest distance between a first side of a first sub-pixel and a second side of a second sub-pixel facing the first side of the first sub-pixel.

The distance between the sub-pixels may be a width of a pixel defining layer, the pixel defining layer defining the first side of the first sub-pixel and the second side of the second sub-pixel by being formed between the first sub-pixel and the second sub-pixel.

The first sub-pixel and the second sub-pixel may be configured to emit light of the same color.

The first sub-pixel and the second sub-pixel may be configured to emit light of different colors.

The compensation factor may decrease as the distance between the sub-pixels increases.

The compensation factor determiner may be configured to determine the compensation factor using a lookup table comprising a relationship of the distance between the sub-pixels and the compensation factor.

The degradation compensator may further include a stress converter configured to accumulate the image data each corresponding to each of the sub-pixels to calculate a stress value, and generate a stress compensation weight according to the stress value, and a memory configured to store at least one of the stress value, the stress compensation weight, and the compensation factor.

A display device according to an exemplary embodiment includes a display panel including a plurality of pixels each having a plurality of sub-pixels, a degradation compensator configured to generate a stress compensation weight by accumulating image data and generate compensation data based on the stress compensation weight and an aperture ratio of the pixels, and a panel driver configured to drive the display panel based on image data applied with the compensation data, in which the panel driver is configured to output a data voltage of different magnitudes for the same image data to the display panel according to the aperture ratio.

The sub-pixels may include a first sub-pixel having a first side and a second sub-pixel having a second side facing the first side of the first sub-pixel, and the aperture ratio may be determined by a distance between the first side and the second side.

The sub-pixels may further include a pixel defining layer disposed between the first side of the first sub-pixel and the second side of the second sub-pixel, and the aperture ratio may be a width of the pixel defining layer.

The first sub-pixel and the second sub-pixel may be configured to emit light of the same color.

The first sub-pixel and the second sub-pixel may be configured to emit light of different colors.

At least one of the sub-pixels may include an emission region, and the aperture ratio may be determined by a length in a first direction of the emission region.

The at least one of the sub-pixels may include a pixel defining layer and a first electrode, and the emission region may correspond to a portion of the first electrode exposed by the pixel defining layer.

At least one of the sub-pixels may include a pixel defining layer and a first electrode, and the aperture ratio may be determined based on an area of the first electrode exposed by the pixel defining layer.

When the aperture ratio is greater than a predetermined reference aperture ratio, a compensated data voltage corresponding to the image data may be less than the data voltage before aperture ratio compensation.

When the aperture ratio is greater than a predetermined reference aperture ratio, a current flowing the display panel by a compensated data voltage corresponding to the image data may be greater than a current flowing the display panel by the data voltage before aperture ratio compensation.

When the aperture ratio is greater than a predetermined reference aperture ratio, a luminance of the display panel by a compensated data voltage corresponding to the image data may be greater than a luminance of the display panel due to the data voltage before aperture ratio compensation.

When the aperture ratio is less than a predetermined reference aperture ratio, a compensated data voltage corresponding to the image data may be greater than the data voltage before aperture ratio compensation.

When the aperture ratio is less than a predetermined reference aperture ratio, a current flowing the display panel by a compensated data voltage corresponding to the image data may be less than a current flowing the display panel due to the data voltage before aperture ratio compensation.

When the aperture ratio is less than a predetermined reference aperture ratio, a luminance of the display panel by a compensated data voltage corresponding to the image data may be lower than a luminance of the display panel by the data voltage before aperture ratio compensation.

The magnitude of an absolute value of the data voltage may increase as the aperture ratio increases for the same image data.

The degradation compensator may include a compensation factor determiner configured to determine an aperture ratio compensation factor based on the aperture ratio of the sub-pixels, and a data compensator configured to apply the aperture ratio compensation factor to the stress compensation weight to generate the compensation data.

The aperture ratio compensation factor may decrease as the aperture ratio increases.

The compensation factor determiner may be configured to determine the compensation factor using a lookup table including a relationship of the aperture ratio of the pixels and the aperture ratio compensation factor.

The compensation factor determiner may be configured to determine the aperture ratio compensation factor based on a difference between the aperture ratio of the pixels and a predetermined reference aperture ratio.

The degradation compensator may further include a memory configured to store the aperture ratio compensation factor corresponding to the aperture ratio.

A method for compensating image data of a display device according to an exemplary embodiment includes the steps of calculating a distance between adjacent sub-pixels using an optical measurement, determining an aperture ratio compensation factor corresponding to the distance between the adjacent sub-pixels, and compensating a deviation of a lifetime curve according to a difference of the aperture ratio by applying the aperture compensation factor to compensation data.

The distance between the sub-pixels may be a width of a pixel defining layer, the pixel defining layer defining a first side of a first sub-pixel and a second side of a second sub-pixel by being formed between the first sub-pixel and the second sub-pixel, and the width of the pixel defining layer is the shortest length between the first side of the first sub-pixel and the second side of the second sub-pixel.

The aperture ratio compensation factor may decrease as the distance between the sub-pixels increases.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
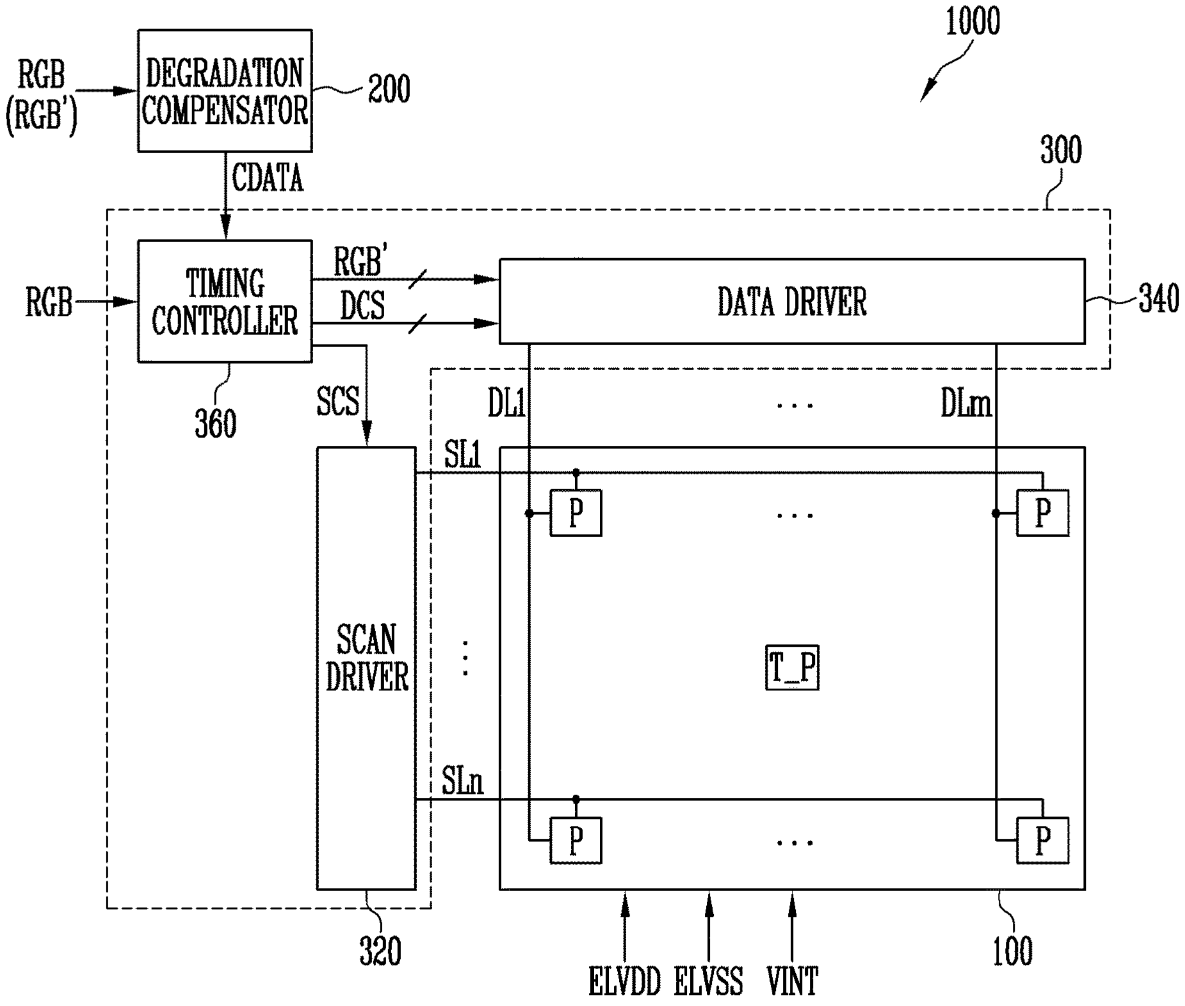
FIG. 1 is a block diagram of a display device according to an exemplary embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As is customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
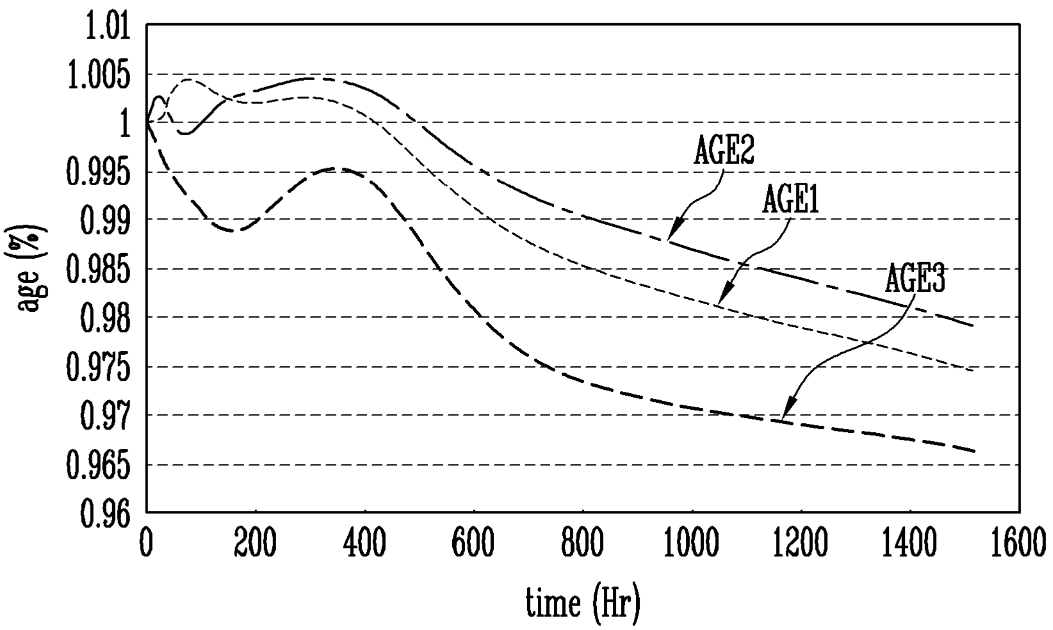
FIG. 2 is a graph schematically illustrating a lifetime deviation of a pixel due to a difference in aperture ratio of a pixel according to an exemplary embodiment.

FIG. 1 is a block diagram of a display device according to an exemplary embodiment. FIG. 2 is a graph schematically illustrating a lifetime dispersion of a pixel due to a difference in aperture ratio of a pixel according to an exemplary embodiment.

Referring to FIGS. 1 and 2, a display device 1000 may include a display panel 100, a degradation compensator 200, and a panel driver 300.

The display device 1000 may include an organic light emitting display device, a liquid crystal display device, and the like. The display device 1000 may include a flexible display device, a rollable display device, a curved display device, a transparent display device, a mirror display device, and the like.

The display panel 100 may include a plurality of pixels P and display an image. More specifically, the display panel 100 may include pixels P formed at intersections of a plurality of scan lines SL1 to SLn and a plurality of data lines DL1 to DLm. In some exemplary embodiments, each of the pixels P may include a plurality of sub-pixels. Each of the sub-pixels may emit one of red, green, and blue color light. However, the inventive concepts are not limited thereto, and each of the sub-pixels may emit color light of cyan, magenta, yellow, and the like.

In some exemplary embodiments, the display panel 100 may include a target pixel T_P for measuring or calculating an aperture ratio (or an opening ratio) of the pixel P. The target pixel T_P may be selected from among the pixels P. For example, a pixel disposed at the center of the display panel 100 may be selected as the target pixel T_P. However, the inventive concepts are not limited to the number, position, and the like of the target pixel T_P. For example, the aperture ratio of each of the pixels P may be measured or calculated.

The degradation compensator 200 may accumulate image data to generate a stress compensation weight, and output compensation data CDATA based on the stress compensation weight and the aperture ratio of the pixel P. In some exemplary embodiments, the degradation compensator 200 may include a compensation factor determiner that determines a compensation factor based on a distance between adjacent sub-pixels, and a data compensator that applies the compensation factor to the stress compensation weight to generate the compensation data CDATA for compensating image data RGB.

The compensation data CDATA may include the compensation factor (e.g., an aperture ratio compensation factor) that compensates for the stress compensation weight and the aperture ratio difference. In some exemplary embodiments, the degradation compensator 200 may calculate a stress value from the accumulated image data (RGB and/or RGB') and generate the stress compensation weight according to the stress value. The stress value may include information on the emission time, grayscale value, brightness, temperature, etc., of the pixels.

The stress value may be a value calculated by summing all image data of the entire pixels P, or may be generated in units of pixel blocks including individual pixels or groups of pixels. In particular, the stress value may be equally applied to all of the pixels P or independently applied to each individual pixel or groups of the pixels.

In some exemplary embodiments, the degradation compensator 200 may be implemented as a separate application processor (AP). In some exemplary embodiments, at least a portion or the entire degradation compensator 200 may be included in a timing controller 360. In some exemplary embodiments, the degradation compensator 200 may be included in an integrated circuit (IC) or IC chip including the data driver 340.

In some exemplary embodiments, the panel driver 300 may include a scan driver 320, a data driver 340, and the timing controller 360.

The scan driver 320 may provide a scan signal to the pixels P of the display panel 100 through the scan lines SL1 to SLn. The scan driver 320 may provide the scan signal to the display panel 100 based on a scan control signal SCS received from the timing controller 360.

The data driver 340 may provide a data signal, to which the compensation data CDATA is applied, to the pixels P of the display panel 100 through the data lines DL1 to DLm. The data driver 340 may provide the data signal (e.g., a data voltage) to the display panel 100 based on a data drive control signal DCS received from the timing controller 360. In some exemplary embodiments, the data driver 340 may convert the image data RGB', to which lifetime compensation data ACDATA is applied, into an analog data voltage.

In some exemplary embodiments, the data driver 340 may output a data voltage that corresponds to the image data RGB with different magnitudes according to the aperture ratio, based on the lifetime compensation data ACDATA. For example, when the aperture ratio is greater than a predetermined reference aperture ratio, the magnitude of an absolute value of a compensated data voltage may be greater than the magnitude of the absolute value of the data voltage before the compensation, to which the aperture ratio is not reflected. When the aperture ratio is less than the predetermined reference aperture ratio, the magnitude of the absolute value of the compensated data voltage may be less than the magnitude of the absolute value of the data voltage before the compensation, to which the aperture ratio is not reflected.

The timing controller 360 may receive image data RGB from an external graphic source or the like, and control the driving of the scan driver 320 and the data driver 340. The timing controller 360 may generate the scan control signal SCS and the data drive control signal DCS. In some exemplary embodiments, the timing controller 360 may apply the compensation data CDATA to the image data RGB to generate the compensated image data RGB'. The compensated image data RGB' may be provided to the data driver 340.

In some exemplary embodiments, the timing controller 360 may further control the operation of the degradation compensator 200. For example, the timing controller 360 may provide the compensated image data RGB' to the degradation compensator 200 for each frame. The degradation compensator 200 may accumulate and store the compensated image data RGB'.

The panel driver 300 may further include a power supply for generating a first power supply voltage ELVDD, a second power supply voltage ELVSS, and initialization power supply voltage VINT to drive the display panel 100.

FIG. 2 shows the deviation of the lifetime curve of the pixel P (or the display panel 100) according to the aperture ratio of the pixel P. The organic light emitting diode included in the pixel P has a characteristic, in which the luminance decreases with the passage of time as a result of deterioration of the material itself. Therefore, as shown in FIG. 2, the lifetime of the pixel P and/or the display panel 100 is reduced due to reduction of the luminance.

A difference in aperture ratio may be generated for each display panel 100 or for each pixel P by the deviation of a pixel forming process. The aperture ratio of the pixel P may be a ratio of an area of an emission region of one pixel P to a total area of the one pixel P defined by a pixel defining layer. The emission region may correspond to an area of a surface of the first electrode exposed by the pixel defining layer.

The aperture ratio of the pixel P affects the amount of electron-hole recombination in an organic light emitting layer of the organic light emitting diode, and a current density flowing into the organic light emitting diode. For example, the current density may be decreased as the aperture ratio of the pixel P increases, which may reduce the lifetime shortening speed of the pixel P over time.

FIG. 2 shows the lifetime curve of the reference aperture ratio AGE1. The reference aperture ratio may be a value set in the display panel manufacturing process. When the aperture ratio of the pixel P (or the aperture ratio of the display panel 100) is greater than the reference aperture ratio due to the manufacturing process deviation, a planar area of the organic light emitting diode may be increased and the current density may become lower. Thus, the lifetime shortening speed of the pixel P over time may be reduced by the decreased current density, as shown in AGE2 of FIG. 2. That is, a slope of the lifetime curve becomes gentle. In addition, when the aperture ratio of the pixel P (or the aperture ratio of the display panel 100) is less than the reference aperture ratio by the manufacturing process, the lifetime shortening speed may be increased, as shown in AGES of FIG. 2. That is, the slope of the lifetime curve may be accelerated.

As described above, a large deviation may be generated in the lifetime curve with the passage of time depending on the aperture ratio of the pixel P. The display device 1000 according to an exemplary embodiment may include the degradation compensator 200 to apply the compensation factor reflecting the aperture ratio deviation to the compensation data CDATA. Therefore, the lifetime curve deviation between the pixels P or the display panels 100 due to the aperture ratio deviation may be improved, and the life curves may be adjusted to correspond to a target life curve. In addition, the application of the afterimage compensation (or degradation compensation) algorithm based on the luminance drop can be facilitated.

Figure 3:
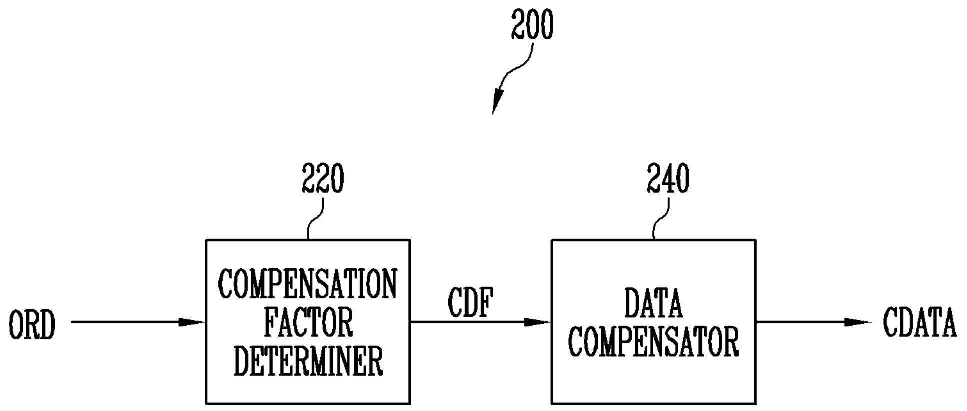
FIG. 3 is a block diagram of a degradation compensator according to an exemplary embodiment.

FIG. 3 is a block diagram of a degradation compensator according to an exemplary embodiment.

Referring to FIG. 3, the degradation compensator 200 may include a compensation factor determiner 220 and a data compensator 240.

The compensation factor determiner 220 may determine a compensation factor CDF based on an aperture ratio ORD of the pixels. The compensation factor CDF may be an aperture ratio compensation factor CDF. More particularly, the aperture ratio compensation factor CDF may be a compensation value for improving deviation of the lifetime curve of FIG. 2.

In some exemplary embodiments, the aperture ratio ORD data may be calculated based on an area of the emission region of the sub-pixel or a length thereof in a predetermined direction. Here, the emission region may correspond to a surface of a first electrode of the sub-pixel exposed by the pixel defining layer.

When the aperture ratio ORD is substantially equal to a reference aperture ratio or falls within a predetermined error range, the aperture ratio compensation factor CDF may be set 1. When the aperture ratio ORD is less than the reference aperture ratio, the aperture ratio compensation factor CDF may be set to a value less than 1. Further, when the aperture ratio ORD is greater than the reference aperture ratio, the aperture ratio compensation factor CDF may be set to a value greater than 1. Here, the aperture ratio compensation factor CDF may be decreased as the aperture ratio ORD increases. In some exemplary embodiments, the compensation factor determiner 220 may determine the aperture ratio compensation factor CDF using a lookup table or function, in which the relationship between the aperture ratio ORD and the aperture ratio compensation factor CDF is set.

The data compensator 240 may apply the aperture ratio compensation factor CDF to the stress compensation weight to generate compensation data CDATA for compensating the image data. The stress compensation weight may be calculated according to the stress value extracted from the accumulated image data. The stress value may include an accumulated luminance, an accumulated emission time, temperature information, and the like.

As described above, the degradation compensator 200 according to an exemplary embodiment may apply the aperture ratio compensation factor CDF for compensating the aperture ratio deviation to the compensation data CDATA, so that the lifetime curves of the display panel 100 or pixels P may be shifted toward the target lifetime curve to make the deviations of life curves uniform.

Figure 4A:
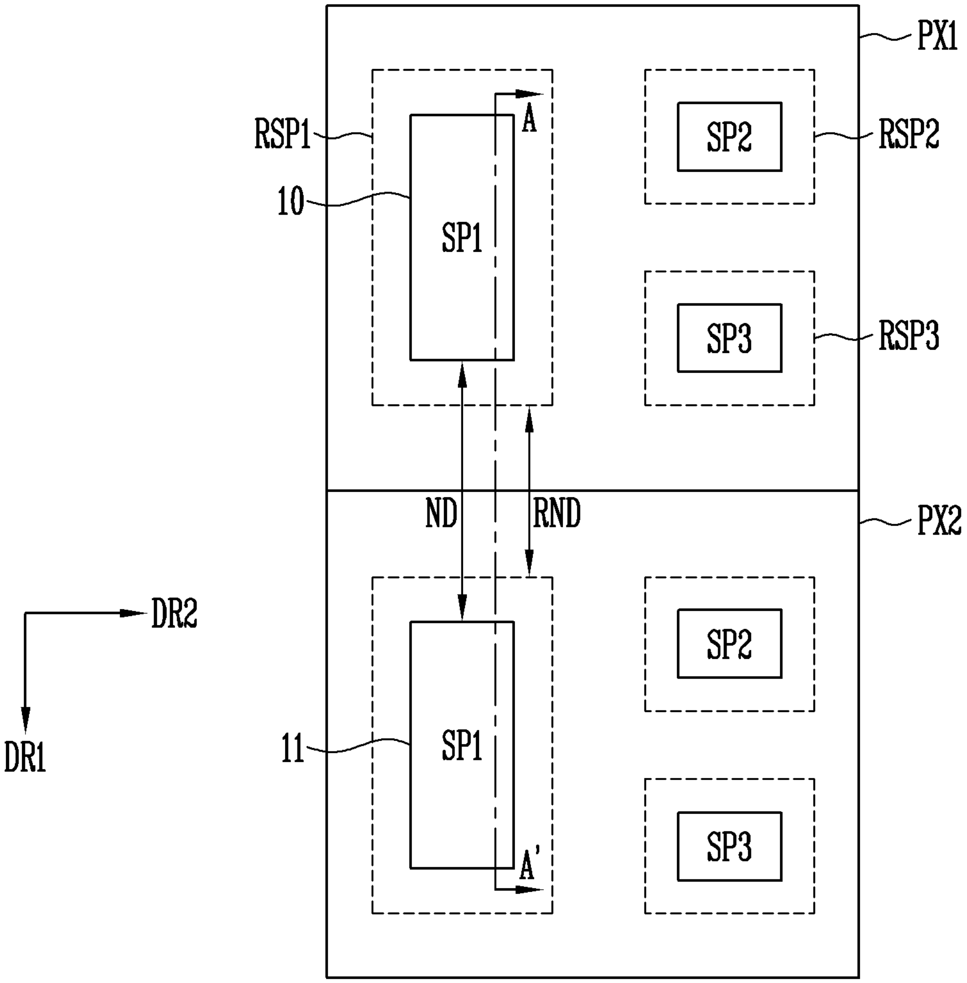
FIGS. 4A and 4B are diagrams illustrating an example of calculating an aperture ratio of pixels.
Figure 4B:
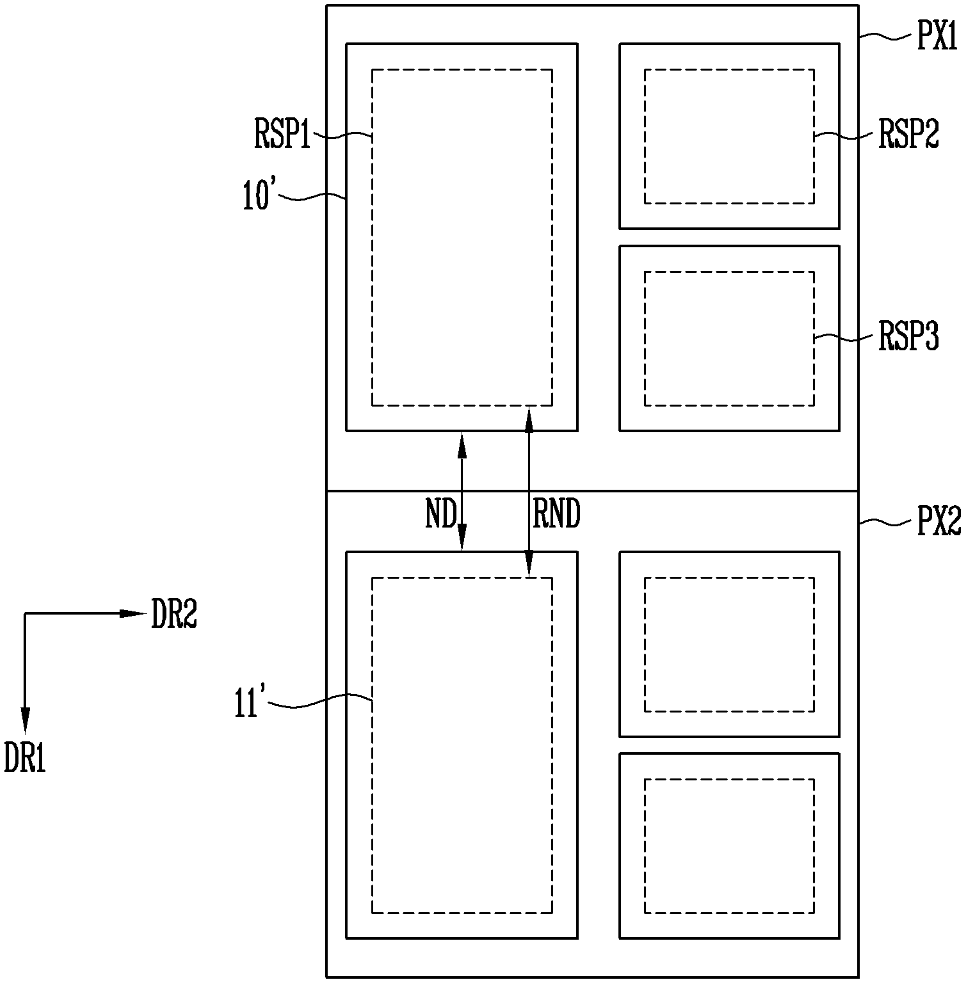
Figure 5A:
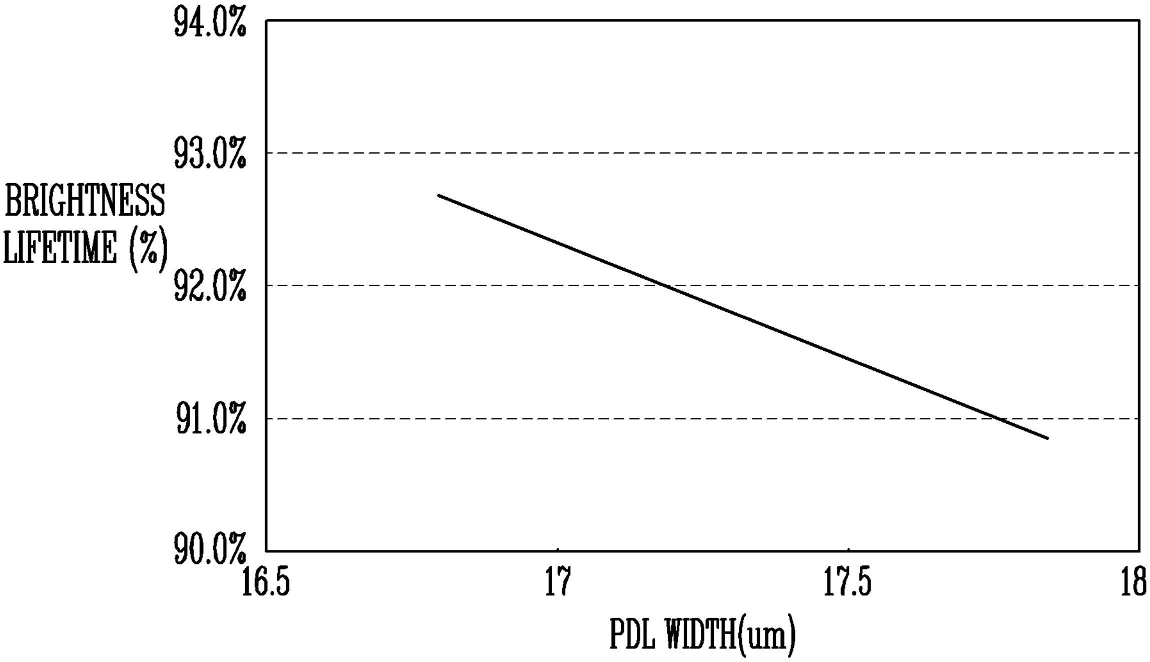
FIGS. 5A and 5B are graphs illustrating a relationship between the aperture ratio and the lifetime of a pixel according to an exemplary embodiment.
Figure 5B:
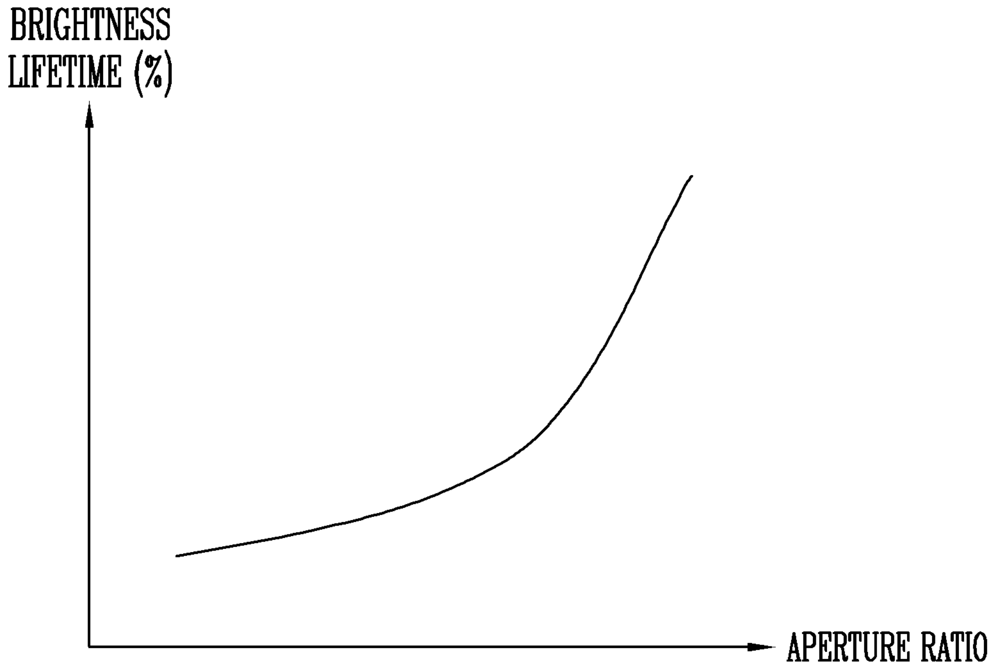

FIGS. 4A and 4B are diagrams illustrating an example of calculating an aperture ratio of pixels. FIGS. 5A and 5B are graphs illustrating a relationship between the aperture ratio and the lifetime of a pixel.

Referring to FIGS. 3 to 5B, the aperture ratio ORD of the pixels PX1 and PX2 may be different from the reference aperture ratio due to manufacturing process variations.

The display panel may include a plurality of pixels PX1 and PX2. In some exemplary embodiments, each of the pixels PX1 and PX2 may include first, second, and third sub-pixels SP1, SP2, and SP3. For example, the first to third sub-pixels SP1, SP2, and SP3 may emit color light one of red, green, and blue, respectively. Here, each of the first to third sub-pixels SP1, SP2, and SP3 may denote an emission region of the first to third sub-pixels SP1, SP2, and SP3, respectively.

The aperture ratio ORD may not be related to the pixel shift. Further, it is assumed that, due to process characteristics, the emission region of the sub-pixel 10 is enlarged or reduced in a substantially uniform ratio in the up, down, left, and right directions.

Therefore, in some exemplary embodiments, as shown in FIGS. 4A and 4B, the aperture ratio ORD may be calculated based on a distance ND between adjacent sub-pixels. For example, the reference distance RND corresponding to the reference aperture ratio may be set, and the actual aperture ratio ORD may be calculated from a ratio of the distance ND between the actually measured or calculated sub-pixels and the reference distance RND. That is, the area of the emission region may be derived from the distance ND between the sub-pixels by enlarging/reducing the emission region at a uniform ratio, and the actual aperture ratio ORD may be calculated from the derived area of the emission region.

As illustrated in FIG. 4A, the actual aperture ratio of the pixel may be less than the reference aperture ratio. That is, the actual sub-pixels SP1, SP2, and SP3 may be formed smaller than reference sub-pixels RSP1, RSP2, and RSP3 corresponding to the reference aperture ratio.

In some exemplary embodiments, the distance ND between the sub-pixels may be determined by a distance between a first side of a first sub-pixel 10 and a second side of a second sub-pixel 11 in a first direction DR1. The first side of the first sub-pixel 10 and the second side of the second sub-pixel 11 may be adjacent to each other. For example, the distance ND between the sub-pixels may correspond to a width of the pixel defining layer disposed between the first sub-pixel 10 and the second sub-pixel 11. Here, the first sub-pixel 10 and the second sub-pixel 11 may emit light of the same color. For example, both of the first sub-pixel 10 and the second sub-pixel 11 may be blue sub-pixels emitting blue color light. However, the inventive concepts are not limited thereto, and the position at which the distance ND between the sub-pixels is calculated may be varied.

According to an exemplary embodiment, the distance ND between the sub-pixels 10 and 11 may be greater than the reference distance RND, as shown in FIG. 4B.

Referring to FIG. 4B, the actual aperture ratio of the pixel may be greater than the reference aperture ratio. That is, the actual sub-pixels 10' and 11' may be formed to be larger than the reference sub-pixels RSP1, RSP2, and RSP3 corresponding to the reference aperture ratio. Therefore, the distance ND between the sub-pixels 10' and 11' may be less than the reference distance RND.

In some exemplary embodiments, the distance ND between the sub-pixels may be a distance between a first side of the first sub-pixel 10' and a second side of the second sub-pixel 11'. The first side of the first sub-pixel 10 and the second side of the second sub-pixel 11 may be adjacent to each other. For example, the distance ND between the sub-pixels 10' and 11' may correspond to the width of the pixel defining layer disposed between the first sub-pixel 10' and the second sub-pixel 11'.

FIG. 5A shows the relationship between the width of the pixel defining layer and the brightness lifetime (or luminance lifetime). The brightness lifetime shows the degree to which the displayed luminance level decreases for the same image data. That is, as the width of the pixel defining layer increases, the brightness lifetime may be decreased. FIG. 5B shows the relationship between the aperture ratio ORD of the pixel and the brightness lifetime. Since the width of the pixel defining layer and the aperture ratio ORD of the pixel have an inverse relationship, the brightness lifetime may be increased as the aperture ratio ORD of the pixel increases.

The degradation compensator according to an exemplary embodiment may generate the aperture ratio compensation factor to change (or shift) the lifetime curve in a direction of reducing the brightness lifetime for a pixel (or a display panel) having an excessively large aperture ratio ORD, and generate the aperture ratio compensation factor to change (or shift) the lifetime curve in a direction for increasing the luminance lifetime for a pixel having an excessively small aperture ratio ORD. Therefore, the lifetime deviation due to the aperture ratio ORD deviation may be improved.

Figure 6A:
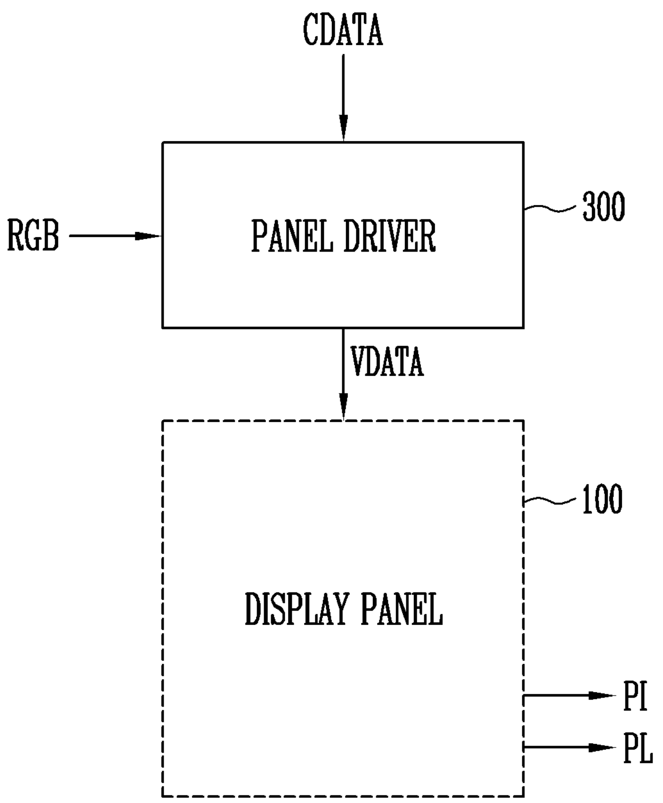
FIG. 6A is a block diagram of a panel driver included in the display device of FIG. 1 according to an exemplary embodiment.
Figure 6B:
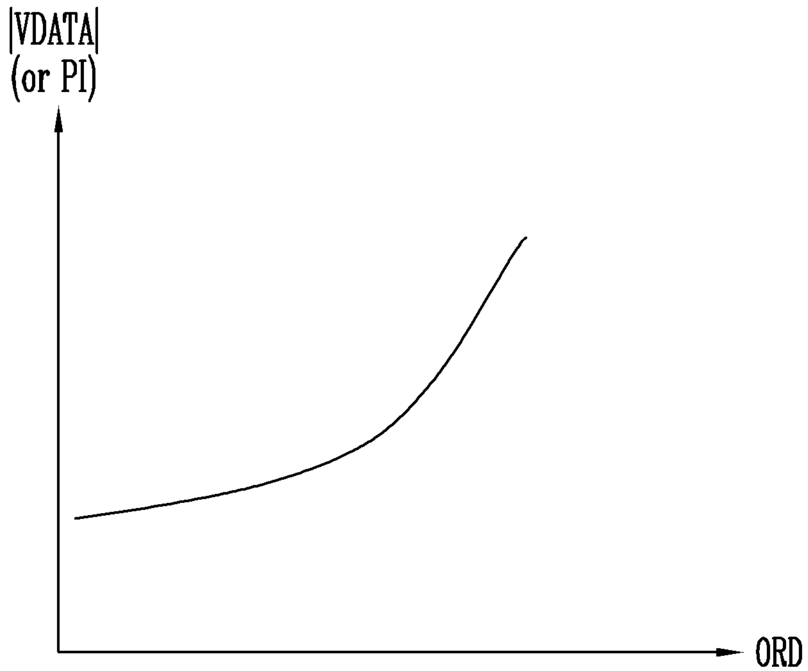
FIG. 6B is a graph illustrating a relationship between the aperture ratio and a current in a display panel according to an operation of the panel driver of FIG. 6A according to an exemplary embodiment.

FIG. 6A is a block diagram illustrating a panel driver included in the display device of FIG. 1 according to an exemplary embodiment. FIG. 6B is a graph illustrating a relationship between the aperture ratio and a current in a display panel according to an operation of the panel driver of FIG. 6A.

Referring to FIGS. 1, 6A, and 6B, the panel driver 300 may drive the display panel 100 by reflecting the compensation data CDATA to the image data RGB. In some exemplary embodiments, the panel driver 300 may include the scan driver 320, the data driver 340, and the timing controller 360 of FIG. 1.

The panel driver 300 may output the data voltage VDATA corresponding to the image data RGB that has different magnitudes according to the aperture ratio ORD. In particular, the magnitude of the data voltage VDATA may be adjusted by applying the compensation data CDATA to the image data RGB received from an external graphic source or the like.

The image data RGB and the compensation data CDATA may be data in the digital format, and the panel driver 300 may convert the digital format compensated image data (represented as RGB' in FIG. 1) into an analog format data voltage VDATA. For example, the data driver 340 included in the panel driver 300 may provide the data voltage VDATA to the display panel 100 through the data lines DL1 to DLm.

The data voltage VDATA provided to the panel driver 300 on the same image data RGB (for example, the same image) may be varied according to the aperture ratio ORD. The data voltage VDATA may be compensated based on the aperture ratio compensation factor generated in the degradation compensator (200 in FIG. 1). For example, for the same image data RGB, the magnitude of the absolute value of the compensated data voltage VDATA may be increased as the aperture ratio ORD increases. Similarly, for the same image data (RGB), a display panel current PI and/or luminance PL of the display panel 100 may be increased as the aperture ratio ORD increases.

In some exemplary embodiments, when the aperture ratio ORD is greater than a predetermined reference aperture ratio, the compensated data voltage VDATA corresponding to the image data RGB may be less than the data voltage before the aperture ratio compensation. For example, when the driving transistor of the pixel P included in the display panel 100 is a p-channel metal oxide semiconductor (PMOS) transistor, the data voltage may be a negative voltage. In this case, the driving current of the pixel P may be increased as the data voltage decreases. That is, the luminance PL of the display panel 100 or the display panel current PI may be increased as the data voltage decreases.

In some exemplary embodiments, for the same image data RGB, the aperture ratio compensation factor generated in the deterioration compensator may become greater as the aperture ratio ORD increases. The magnitude of the compensated data voltage VDATA may be decreased corresponding to the increase of the aperture ratio compensation factor.

However, the inventive concepts are not limited thereto. For example, the driving transistor of the pixel P may be an n-channel metal oxide semiconductor (NMOS) transistor, in which the data voltage may be set to a positive voltage. As such, the driving current of the pixel P may be increased as the magnitude of the data voltage increases.

In some exemplary embodiments, when the aperture ratio ORD is greater than the reference aperture ratio, the display panel current PI in the display panel 100 by the compensated data voltage VDATA corresponding to the image data RGB may be greater than a current in the display panel 100 by the data voltage before aperture ratio compensation. Thus, the degradation speed of the display panel 100 or the pixel P having the aperture ratio ORD greater than the reference aperture ratio may be accelerated to that of a display panel having the reference aperture ratio, by increasing the compensated data voltage VDATA. Accordingly, the lifetime curve may be shifted toward a lifetime curve corresponding to the reference aperture ratio. That is, the deviation of the life curve due to the aperture ratio deviation may be improved.

Here, the display panel current PI may be an average current of the display panel 100, a current detected at the predetermined pixel P, or a current of a power line connected to the pixels P. However, the inventive concepts are not limited thereto.

When the aperture ratio ORD is greater than the reference aperture ratio, the luminance PL of the display panel 100 by the compensated data voltage VDATA corresponding to the image data RGB may be greater than a luminance of the display panel 100 by the data voltage before the compensation that reflects the aperture ratio ORD. Therefore, the degradation speed (deterioration speed) of the display panel 100 may be accelerated to that of the display panel having the reference aperture ratio.

In some exemplary embodiments, when the aperture ratio ORD is less than the reference aperture ratio, the compensated data voltage VDATA corresponding to the image data RGB may be greater than the data voltage before aperture ratio compensation. In addition, the driving current of the pixel P may be decreased as the data voltage increases. That is, the luminance PL of the display panel 100 or the display panel current PI may be increased as the data voltage decreases.

More particularly, when the aperture ratio ORD is less than the reference aperture ratio, the display panel current PI by the compensated data voltage VDATA corresponding to the image data RGB may be less than the display panel current PI before the aperture ratio compensation. In addition, when the aperture ratio ORD is less than the reference aperture ratio, the luminance PL of the display panel 100 by the compensated data voltage VDATA corresponding to the image data RGB may be less than the luminance PL of the display panel 100 before the compensation that reflects the aperture ratio ORD. Accordingly, the degradation speed of the display panel 100 having the aperture ratio ORD less than the reference aperture ratio may be dropped to the degradation speed level of the display panel having the reference aperture ratio. Therefore, the deviation of the life curve due to the aperture ratio ORD deviation may be improved.

As illustrated in FIG. 6B, for the same image data RGB, as the aperture ratio ORD of the display panel 100 or the pixel P is increased, the magnitude of the absolute value of the compensated data voltage VDATA and the and/or the display panel current PI may be increased. In some exemplary embodiments, the larger the aperture ratio ORD of the display panel 100 or the pixel P, the luminance PL of the display panel 100 may be greater.

Figure 7:
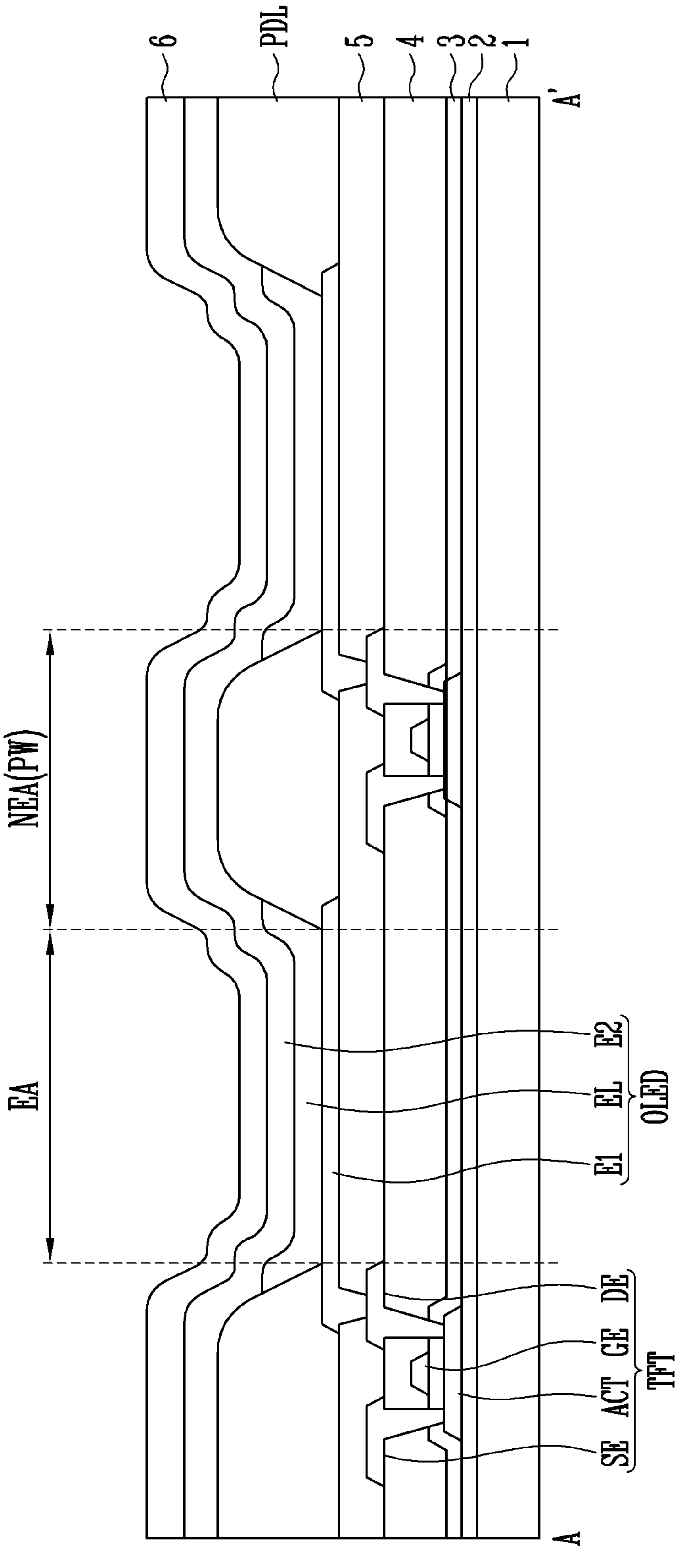
FIG. 7 is a schematic cross-sectional view taken along line A-A' of the pixel of FIG. 4A.

FIG. 7 is a schematic cross-sectional view taken along line A-A' of the pixel of FIG. 4A.

Referring to FIGS. 4A and 7, the display panel may include a plurality of pixels PX1 and PX2. Each of the pixels PX1 and PX2 may be divided into an emission region EA and a peripheral region NEA.

The display panel may include a substrate 1, a lower structure including at least one transistor TFT for driving the pixels PX1 and PX2, and a light emitting structure.

The substrate 1 may be a rigid substrate or a flexible substrate. The rigid substrate may include a glass substrate, a quartz substrate, a glass ceramic substrate, and a crystalline glass substrate. The flexible substrate may include a film substrate including a polymer organic material and a plastic substrate.

The buffer layer 2 may be disposed on the substrate 1. The buffer layer 2 may prevent impurities from diffusing into the transistor TFT. The buffer layer 2 may be provided as a single layer, but may also be provided as at least two or more layers.

The lower structure including the transistor TFT and a plurality of conductive lines may be disposed on the buffer layer 2.

In some exemplary embodiments, an active pattern ACT may be disposed on the buffer layer 2. The active pattern ACT may be formed of a semiconductor material. For example, the active pattern ACT may include polysilicon, amorphous silicon, oxide semiconductors, and the like.

A gate insulating layer 3 may be disposed on the buffer layer 2 provided with the active pattern ACT. The gate insulating layer 3 may be an inorganic insulating layer including an inorganic material.

A gate electrode GE may be disposed on the gate insulating layer 3, and a first insulating layer 4 may be disposed on the gate insulating layer 3 provided with the gate electrode GE. A source electrode SE and a drain electrode DE may be disposed on the first insulating layer 3. The source electrode SE and the drain electrode DE may be connected to the active pattern ACT by penetrating the gate insulating layer 3 and the first insulating layer 3.

A second insulating layer 5 may be disposed on the first insulating layer 3, on which the source electrode SE and the drain electrode DE are disposed. The second insulating layer 5 may be a planarization layer.

The light emitting structure OLED may include a first electrode E1, a light emitting layer EL, and a second electrode E2.

The first electrode E1 of the light emitting structure OLED may be disposed on the second insulating layer 5. In some exemplary embodiments, the first electrode E1 may be provided as an anode electrode of the light emitting structure OLED. The first electrode E1 may be connected to the drain electrode DE of the transistor TFT through a contact hole penetrating the second insulating layer 5. The first electrode E1 may be patterned for each sub-pixel. The first electrode E1 may be disposed in a part of the peripheral region NEA on the second insulating layer 5 and in the emission region EA.

The first electrode E1 may be formed using metal, an alloy thereof, a metal nitride, a conductive metal oxide, a transparent conductive material, or the like. These may be used alone or in combination with each other.

A pixel defining layer PDL may be disposed in the peripheral region NEA on the second insulating layer 5. The pixel defining layer PDL may expose a portion of the first electrode E1. The pixel defining layer PDL may be formed of an organic material or an inorganic material. The emission region EA of each of the pixels PX1 and PX2 may be defined by the pixel defining layer PDL.

A light emitting layer EL may be disposed on the first electrode E1 exposed by the pixel defining layer PDL. The light emitting layer EL may be disposed to extend along a side wall of the pixel defining layer PDL. In some exemplary embodiments, the light emitting layer EL may be formed using at least one of organic light emitting materials emitting different colors light (e.g., red light, green light, blue light, etc.) depending on the pixels.

The second electrode E2 may be disposed on the pixel defining layer PDL and the organic light emitting layer EL in common. In some exemplary embodiments, the second electrode E2 may be provided as a cathode electrode of the light emitting structure OLED. The second electrode E2 may be formed using metal, an alloy thereof, a metal nitride, a conductive metal oxide, a transparent conductive material, or the like. These may be used alone or in combination with each other. Accordingly, the light emitting structure OLED including the first electrode E1, the organic light emitting layer EL, and the second electrode E2 may be formed.

A thin film encapsulation layer 6 covering the second electrode E2 may be disposed on the second electrode E2. The thin film encapsulation layer 6 may include a plurality of insulating layers covering the light emitting structure OLED. For example, the thin film encapsulation layer 6 may have a structure in which an inorganic layer and an organic layer are alternately stacked. In some exemplary embodiments, the thin film encapsulation layer 6 may be an encapsulating substrate disposed on the light emitting structure OLED and bonded to the substrate 1 by a sealant.

As described above, the region where the first electrode E1 is exposed by the pixel defining layer PDL may be defined as the emission region EA, and the region where the pixel defining layer PDL is located may be defined as the peripheral region NEA. That is, the pixel defining layer PDL may define the sides of sub-pixels adjacent to each other.

As illustrated in FIGS. 4A and 4B, the aperture ratio of the pixels may be calculated from the width PW (or the shortest width) of the pixel defining layer PDL disposed between adjacent sub-pixels. However, the inventive concepts are not limited thereto, and the aperture ratio calculation method may be varied. For example, the aperture ratio of the pixel may be calculated from a length in a predetermined direction of the emission region EA of a predetermined sub-pixel.

In some exemplary embodiments, the width of the pixel defining layer PDL or the length of the emission region EA may be calculated from data obtained by optical imaging to a target pixel.

Figure 8A:
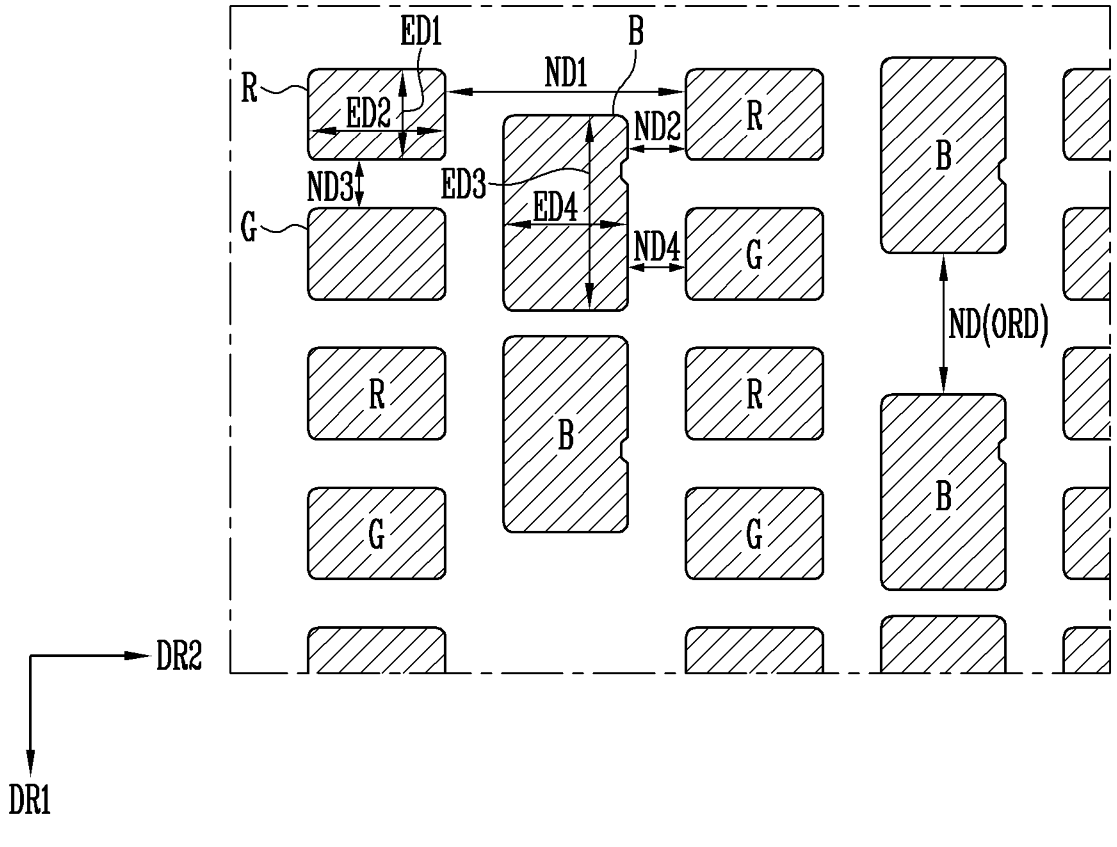
FIG. 8A is a diagram illustrating an example of calculating the aperture ratio of pixels.

FIG. 8A is a diagram illustrating an example of calculating the aperture ratio of pixels.

Referring to FIGS. 7 and 8A, at least one of the distances ND, ND1, ND2, ND3, and ND4 between the sub-pixels in the peripheral region NEA and/or at least one of the distances ED1 to ED4 of the emission regions EA in one direction may be defined as the aperture ratio ORD of the pixel.

In some exemplary embodiments, the aperture ratio ORD may be determined based on an area of the exposed portion of the first electrode E1 included in at least one of the sub-pixels R, G, and B. For example, the area of the exposed portion of the first electrode E1 may be optically calculated, and the calculated value may be compared with a predetermined reference area to determine the aperture ratio ORD.

The sub-pixels R, G, and B shown in FIG. 8A may correspond to the emission regions EA of the sub-pixels R, G, and B, respectively. In some exemplary embodiments, the emission region EA may correspond to a surface of the first electrode E1 exposed by the pixel defining layer PDL.

The sub-pixels R, G, and B may include a red sub-pixel R, a green sub-pixel G, and a blue sub-pixel B. In some exemplary embodiments, the blue sub-pixels B may be arranged in a first direction DR1 to form a first pixel column. The red pixels R and the green pixels G may be alternately arranged in the first direction DR1 to form a second pixel column. The first pixel column and the second pixel column may be alternately arranged in a second direction DR2. Each pixel column may be connected to a data line. However, the inventive concepts are not limited to particular arrangement of the pixels.

In some exemplary embodiments, the aperture ratio ORD may be determined based on the distance between adjacent sub-pixels. Since the emission region EA of the sub-pixel is assumed to be enlarged or reduced in a substantially uniform ratio in the vertical and horizontal directions, the distance between the sub-pixels may be determined as the aperture ratio ORD.

In some exemplary embodiments, the aperture ratio ORD may be determined by applying a distance between adjacent sub-pixels to an area calculation algorithm.

In some exemplary embodiments, the aperture ratio ORD may be determined based on the distance ND between one side of the blue sub-pixel B and one side of the other blue sub-pixel B adjacent thereto in the first direction DR. The distance ND between the blue sub-pixels B adjacent to each other may be determined to the aperture ratio ORD, or area data converted from the distance ND between the adjacent blue sub-pixels B may be determined as the aperture ratio ORD. As shown in FIG. 8A, the distance between the blue sub-pixels B may be the largest, among sub-pixels R, G, and B. As such, the distance may be extracted with respect to the blue sub-pixels B, for example, and determine the aperture ratio deviation. However, the inventive concepts are not limited to a particular method of determining the aperture ratio ORD.

In some exemplary embodiments, the aperture ratio ORD may be determined based on the distance between sub-pixels adjacent to each other in the second direction DR2. For example, the aperture ratio ORD may be determined based on at least one of the distance ND1 between the adjacent red sub-pixels R in the second direction DR2, the distance between the adjacent blue sub-pixel B and red sub-pixel R in the second direction DR2, the distance ND4 between the adjacent blue sub-pixel B and green sub-pixel G in the second direction DR2, and the distance ND4 between the adjacent red sub-pixel R and green sub-pixel G.

Alternatively, the aperture ratio ORD may be determined based on the combination of the distance between the blue sub-pixel B and the red sub-pixels R adjacent a side of the blue sub-pixel B, and the distance between the blue sub-pixel B and the other red sub-pixel adjacent an opposing side of the blue sub-pixel B.

Each of the distances ND, ND1, ND2, ND3, and ND4 between the sub-pixels may correspond to the width PW (see FIG. 7) of the pixel defining layer PDL formed between adjacent sub-pixels.

In some exemplary embodiments, the aperture ratio ORD of the pixel may be determined based on a length in a predetermined direction of at least one emission region EA of the sub-pixels R, G, and B. For example, the aperture ratio ORD may be determined from at least one of a length ED1 of the emission region of the red sub-pixel R in the first direction DR1 and a length ED2 of the emission region of the red sub-pixel R in the second direction DR2. Since the aperture ratio deviation of the blue and green sub-pixels B and G may be substantially the same as the aperture ratio deviation of the red sub-pixel R in terms of process characteristics, the aperture ratio ORD of the pixel may be determined from the aperture ratio of the red sub-pixel R. However, the inventive concepts are not limited thereto, and the aperture ratio ORD of the pixel may be determined by calculating the area of the emission region of each of the sub-pixels R, G, and B.

Alternately, for example, the aperture ratio ORD of the pixel may be determined from a length ED4 of the emission region of the blue sub-pixel B in the first direction DR1 and/or the length ED4 of the blue sub-pixel B in the second direction DR2. In some exemplary embodiments, the aperture ratio ORD of the pixel may be determined from a length of the emission region of the green sub-pixel G in the first direction DR1 and/or in the second direction DR2.

The distance between the sub-pixels and the length of the emission region may be used alone or in combination to determine the aperture ratio ORD.

As described above, the aperture ratio compensation factor may be determined based on the aperture ratio ORD calculated from the distance between adjacent sub-pixels and/or the length (area) of the emission area of the sub-pixel.

Figure 8B:
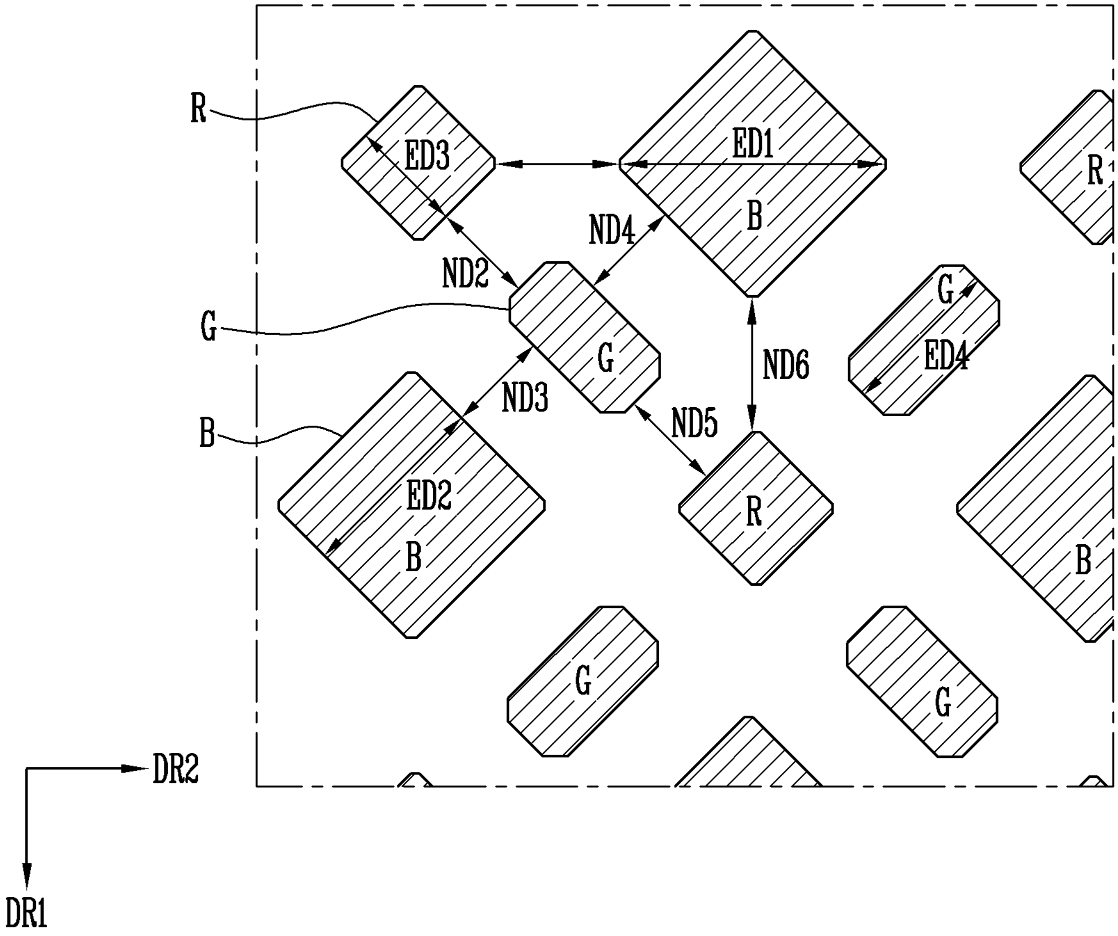
FIG. 8B is a diagram illustrating an example of calculating the aperture ratio of pixels.

FIG. 8B is a diagram illustrating an example of calculating the aperture ratio of pixels.

Referring to FIGS. 7 and 8B, at least one of the distances ND, ND1, ND2, ND3, and ND4 between the sub-pixels in the peripheral region NEA and/or at least one of the distances ED1 to ED4 of the emission regions EA in one direction may be defined as the aperture ratio ORD of the pixel.

The sub-pixels R, G, and B shown in FIG. 8B may correspond to the emission regions EA of the sub-pixels R, G, and B, respectively. In some exemplary embodiments, the emission region EA may correspond to the surface of the first electrode E1 exposed by the pixel defining layer PDL.

The sub-pixels R, G, and B may include a red sub-pixel R, a green sub-pixel G, and a blue sub-pixel B. In some exemplary embodiments, the green sub-pixels G may be arranged in a first direction DR1 to form a first pixel column. The red pixels R and the blue pixels B may be alternately arranged in the first direction DR1 to form a second pixel column. The first pixel column and the second pixel column may be alternately arranged in the second direction DR2. Each pixel column may be connected to a data line. Also, in the arrangement of the pixel columns, the red sub-pixel R and the blue sub-pixel B corresponding to the same row may be alternately arranged in the second direction DR2. The arrangement of such pixels may be defined as an RGB diamond arrangement structure.

In some exemplary embodiments, the aperture ratio ORD may be determined based on a distance between adjacent sub-pixels. Since the emission region EA of the sub-pixel is assumed to be enlarged or reduced in a substantially uniform ratio in the vertical and horizontal directions, the distance between the sub-pixels may be determined as the aperture ratio ORD.

In some exemplary embodiments, the aperture ratio ORD may be determined based on the distance ND1 between one side of the red sub-pixel R and one side of the blue sub-pixel B adjacent thereto in the first direction DR1. Here, the distance ND1 may be the shortest distance between the red sub-pixel R and the blue sub-pixel B in the first direction. Alternatively, the aperture ratio ORD may be determined based on at least one of the distances ND2, ND3, ND4, and ND5 between the adjacent sub-pixels R, G, and B. The distances ND1, ND2, ND3, ND4, and ND5 between the sub-pixels may be used alone or in combination to determine the aperture ratio ORD.

In some exemplary embodiments, the aperture ratio ORD of the pixel may be determined based on a length in a predetermined direction of at least one of the emission areas EA of the sub-pixels R, G, B. For example, an aperture ratio of the blue sub-pixel B may be derived based on a length ED1 in the second direction DR1 of the emission area of the blue sub-pixel B and/or a length ED2 of the emission area of the blue sub-pixel B in a direction perpendicular to one side of the blue sub-pixel B. The aperture ratio deviations of the red and green sub-pixels R and B may be substantially the same as the aperture ratio deviation of the blue sub-pixel B in view of process characteristics, and therefore the aperture ratio ORD of the pixel including the red, green, and blue sub-pixels R, G, and B may be determined by the aperture ratio of the blue sub-pixel B. However, the inventive concepts are not limited thereto, and the aperture ratio ORD of the pixel may be determined by calculating the area of the emission region EA of each of the sub-pixels R, G, and B.

Alternately, for example, the aperture ratio ORD of the pixel may be determined based on a length ED3 in a predetermined direction of the emission region of the red sub-pixel R, and/or a length in a predetermined direction of the emission region of the green sub-pixel G.

In this manner, the aperture ratio compensation factor may be determined based on the aperture ratio ORD calculated from the distance between adjacent sub-pixels and/or the length (area) of the emission region of the sub-pixel.

Figures 9, 10:
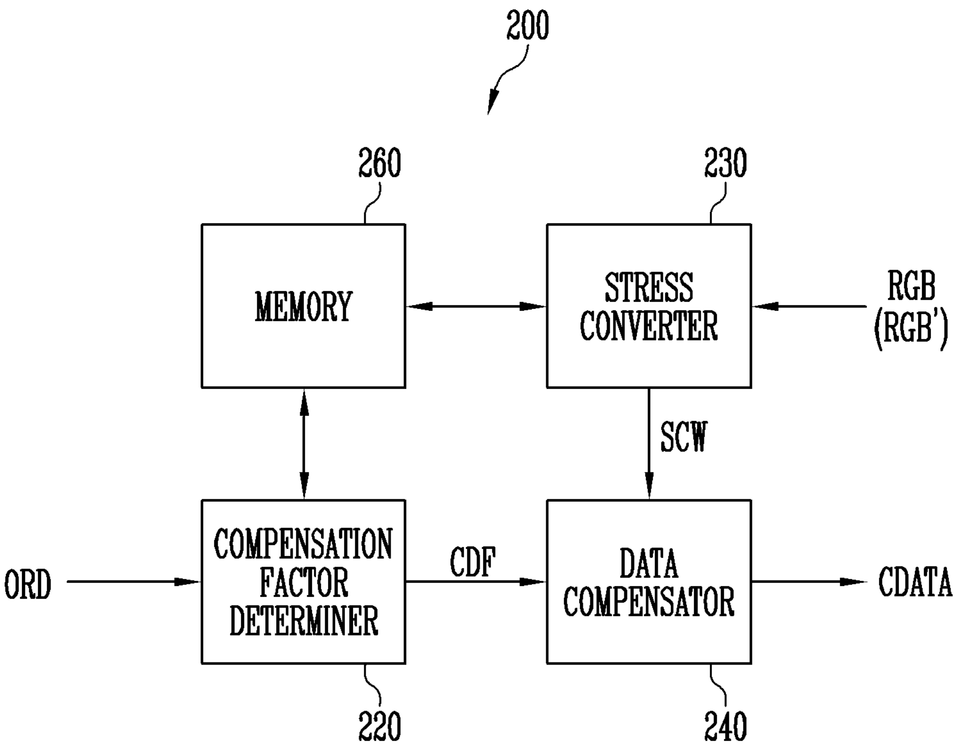
FIG. 9 is a block diagram of the degradation compensator of FIG. 3 according to an exemplary embodiment.
FIG. 10 is a diagram illustrating an operation of a compensation factor determiner in the degradation compensator of FIG. 9 according to an exemplary embodiment.

FIG. 9 is a block diagram illustrating a degradation compensator of FIG. 3 according to an exemplary embodiment.

The degradation compensator of FIG. 9 may be substantially the same as the degradation compensator explained with reference to FIG. 3 except for constructions of a stress converter and a memory. Thus, the same reference numerals will be used to refer to the same or like parts as those of FIG. 3, and repeated descriptions of the substantially the same elements will be omitted to avoid redundancy.

Referring to FIGS. 3 and 9, the degradation compensator 200 may include the compensation factor determiner 220, a stress converter 230, the data compensator 240, and a memory 260.

The degradation compensator 200 may accumulate image data RGB/RGB' to generate a stress compensation weight SCW, and generate compensation data CDATA based on the stress compensation weight SCW.

The compensation factor determiner 220 may determine an aperture ratio compensation factor CDF based on the aperture ratio ORD of the pixels. In some exemplary embodiments, the aperture ratio compensation factor CDF may be decreased as the aperture ratio ORD increases. In some exemplary embodiments, the compensation factor determiner 220 may determine the aperture ratio compensation factor CDF using a lookup table or function in which a relationship between the aperture ratio ORD and the aperture ratio compensation factor CDF is set. The compensation factor determiner 220 may provide the aperture compensation factor CDF to the data compensator 240.

The stress converter 230 may calculate the stress value based on the image data RGB corresponding to each of the sub-pixels. The luminance drop due to the accumulation of the image data RGB may be calculated as the stress value. Such stress value may be determined based on information, such as luminance (or accumulated grayscale values), total emission time, temperature of the display panel, and the like, as a result of accumulation of image data RGB. For example, the stress value may have a shape substantially similar to the lifetime curve of FIG. 1. That is, the stress value may be increased (e.g., the remaining lifetime and luminance are decreased) as the emission time accumulates.

The stress converter 230 may calculate the stress compensation weight SCW according to the stress value. For example, when the luminance drops to 90% of an initial state, that is, when the stress value is 0.9, the stress converter 230 may calculate SCW to be 1.111 (e.g., 1/0.90) as the stress compensation weight SCW.

Meanwhile, the stress converter 230 may store the accumulated stress value for each frame in the memory 260, receive the accumulated stress value from the memory 260, and update the stress value. In some exemplary embodiments, the memory 260 may store the stress compensation weight SCW, and the stress converter 230 may transmit and receive the stress compensation weight SCW to the memory 260.

In some exemplary embodiments, the memory 260 may include the aperture ratio compensation factor CDF corresponding to the aperture ratio ORD. In this case, the compensation factor determiner 220 may receive the aperture ratio compensation factor CDF corresponding to the aperture ratio ORD from the memory 260.

The data compensator 240 may generate the compensation data CDATA for compensating the image data RGB by applying the aperture ratio compensation factor CDF to the stress compensation weight SCW. For example, the data compensator 240 may multiply or add the stress compensation weight SCW by the aperture ratio compensation factor CDF to generate the compensation data CDATA.

For example, when the aperture ratio ORD is greater than the reference aperture ratio, the aperture ratio compensation factor CDF may have a value less than 1 and the compensation data CDATA may be decreased. On the other hand, when the aperture ratio ORD is less than the reference aperture ratio, the aperture ratio compensation factor CDF may have a value greater than 1 and the compensation data CDATA may be increased.

In this manner, the aperture ratio compensation factor CDF, in which the aperture ratio ORD is reflected, may be additionally applied to the compensation data CDATA reflecting the life curve. Therefore, a current density deviation of the pixels with respect to the same image data may be improved, and the deviation of the lifetime curve may be uniformly improved.

Figure 11:
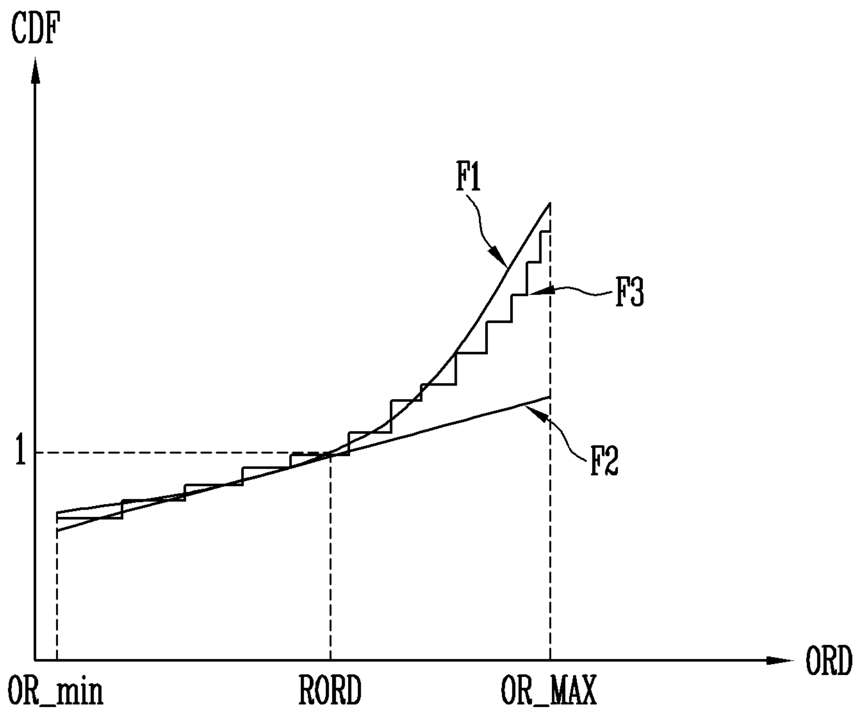
FIG. 11 is a diagram illustrating an operation of a compensation factor determiner in the degradation compensator of FIG. 9 according to an exemplary embodiment.

FIG. 10 is a diagram illustrating an operation of a compensation factor determiner in the degradation compensator of FIG. 9 according to an exemplary embodiment. FIG. 11 is a diagram illustrating an operation of a compensation factor determiner in the degradation compensator of FIG. 9 according to an exemplary embodiment.

Referring to FIGS. 9 to 11, the compensation factor determiner 220 may generate the aperture ratio compensation factor CDF based on the aperture ratio ORD.

In some exemplary embodiments, as illustrated in FIG. 10, the compensation factor determiner 220 may determine the aperture ratio compensation factor CDF using a lookup table LUT, in which a relationship between the aperture ratio ORD and the aperture ratio compensation factor CDF is set. For example, the aperture ratio ORD may be a distance between adjacent sub-pixels. Alternatively, the aperture ratio ORD may be a value obtained by converting the distance between adjacent sub-pixels to a value relative to a reference distance. Still alternatively, the aperture ratio ORD may be an area value calculated using an area calculation algorithm to which the distance between sub-pixels is applied.

By the process dispersion, the aperture ratio ORD can have a value between a minimum opening ratio OR-min and a maximum opening ratio OR_MAX by the process deviation. The aperture ratio compensation factor CDF may be reduced as the aperture ratio ORD increases between the minimum aperture ratio OR-min and the maximum aperture ratio OR_MAX.

When the calculated aperture ratio ORD corresponds to the reference aperture ratio RORD, the aperture ratio compensation factor CDF may be determined as 1.

When the calculated aperture ratio ORD is less than the reference aperture ratio RORD, the aperture ratio compensation factor CDF may be determined to be a value greater than 1. In this case, the image data may be compensated in a direction for improving the luminance. Therefore, the lifetime curve may be shifted toward the lifetime curve of the reference opening ratio RORD.

When the calculated aperture ratio ORD is greater than the reference aperture ratio RORD, the aperture ratio compensation factor CDF may be determined to be a value less than 1. In this case, the image data may be compensated in a direction for decreasing the luminance. Therefore, the lifetime curve may be shifted toward the lifetime curve of the reference opening ratio RORD.

When determining the aperture ratio compensation factor CDF using the lookup table LUT, the aperture ratio compensation factor CDF may be output quickly.

As illustrated in FIG. 11, the compensation factor determiner 220 may determine the aperture ratio compensation factor CDF using one of the functions F1, F2, and F3, in which the relationship between the aperture ratio ORD and the aperture ratio compensation factor CDF is set. In some exemplary embodiments, the relationship function of the aperture ratio ORD and the aperture compensation factor CDF may have a quadratic function or an exponential function form (represented as F1) in a range between the minimum aperture ratio OR_min and the maximum aperture ratio OR_MAX. In some exemplary embodiments, the relationship function of the aperture ratio ORD and the aperture ratio compensation factor CDF may have a linear function form F2. In some exemplary embodiments, the relationship function of the aperture ratio ORD and the aperture ratio compensation factor CDF may have a step function form F3. However, the inventive concepts are not limited thereto, and the relationship between the aperture ratio ORD and the aperture ratio compensation factor CDF may be variously set to minimize the lifetime curve deviation.

Thus, the current density deviation of the pixel with respect to the same image data is improved, and the lifetime curve deviation depending on the aperture ratio may be uniformly improved.

Figure 12A:
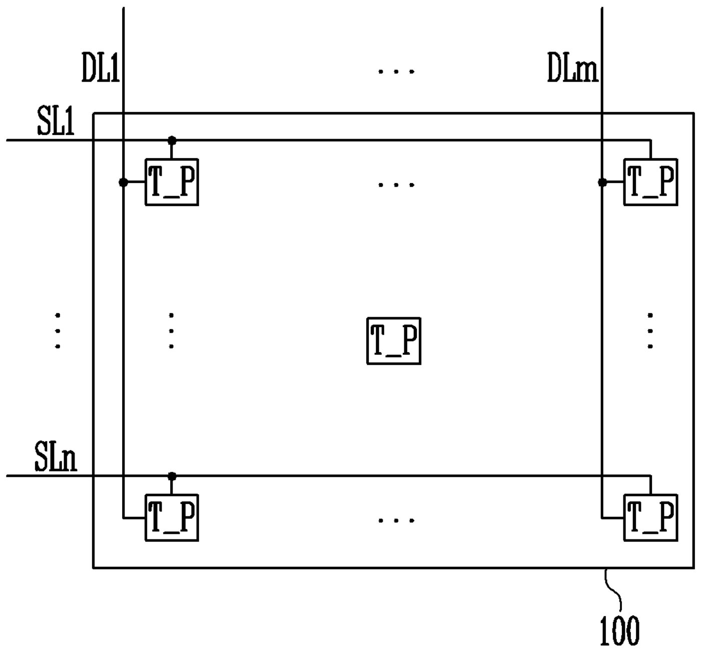
FIGS. 12A and 12B are diagrams illustrating pixels at which optical measurement is performed to calculate the aperture ratio according to exemplary embodiments.
Figure 12B:
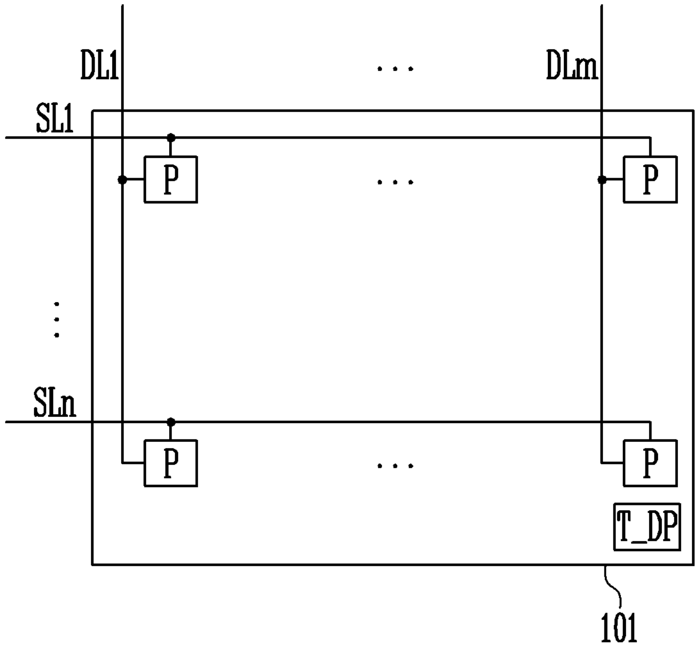

FIGS. 12A and 12B are diagrams illustrating pixels at which optical measurement is performed to calculate the aperture ratio according to exemplary embodiments.

Referring to FIGS. 1, 12A, and 12B, the display panels 100 and 101 may include a target pixel T_P for measuring or calculating the aperture ratio. The target pixel T_P may be one or more pixels selected from the plurality of pixels P.

In some exemplary embodiments, an image of the target pixel T_P may be calculated by an optical measuring instrument or the like. The aperture ratio may be calculated by image analysis of the target pixel T_P. For example, the aperture ratio may be calculated from a distance between the sub-pixels included in the target pixel T_P or a length in one direction of an emission area of selected one sub-pixel.

In some exemplary embodiments, as illustrated in FIG. 12A, the display panel 100 may include a predetermined plurality of target pixels T_P, and the aperture ratio in each of the target pixels T_P may be measured or calculated. In one exemplary embodiment, compensation data each corresponding to the aperture ratio of each of the target pixels T_P may be generated. For example, aperture ratios of the target pixels T_P may be different from each other, and aperture ratio compensation factors may be determined separately for each pixel.

In some exemplary embodiments, an aperture ratio compensation factor corresponding to an average value of the aperture ratios of the target pixels T_P may be applied to the entire image data. Therefore, the same aperture ratio compensation factor may be applied to the entire display panel 100.

In some exemplary embodiments, as illustrated in FIG. 12B, the display panel 101 may include a dummy pixel T-DP for aperture ratio measurement. The dummy pixel T-DP may be disposed at an outer portion of the display panel 101 so as not to affect image display. The same aperture ratio compensation factor may be applied to the entire display panel 101 (e.g., the entire image data) based on the aperture ratio of the dummy pixel T-DP.

Figure 13:
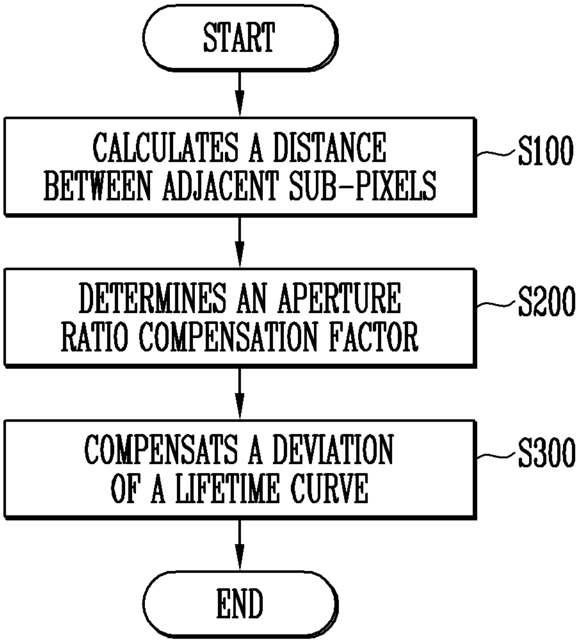
FIG. 13 is a flowchart of a method for compensating image data of the display device according to an exemplary embodiment.

FIG. 13 is a flowchart of a method for compensating image data of the display device according to an exemplary embodiment.

Referring to FIG. 13, the method for compensating image data of the display device may include calculating a distance between adjacent sub-pixels using an optical measurement at S100, determining an aperture ratio compensation factor corresponding to the distance between the adjacent sub-pixels at S200, and compensating a deviation of a lifetime curve according to a difference of the aperture ratio by applying the aperture compensation factor to compensation data at S300.

In some exemplary embodiments, the distance between adjacent sub-pixels may be calculated using the optical measurement at S100. The aperture ratio of the pixel may be predicted from the distance between the sub-pixels. However, the inventive concepts are not limited to a particular aperture ratio calculation method. For example, the aperture ratio of the pixel may be determined from a length in one direction of an emission region of at least one sub-pixel.

The aperture ratio compensation factor corresponding to the distance between the sub-pixels or the calculated aperture ratio may be determined at S200. The aperture ratio compensation factor may be determined from an experimentally derived relationship between the aperture ratio and a current flowing through the pixel. For example, pixels (or display panels) having different aperture ratios are emitted in full-white (maximum grayscale level) for a long time, and deviation of the lifetime curve derived therefrom is calculated to set an aperture ratio compensation factor according to the aperture ratio.

In some exemplary embodiments, the aperture ratio compensation factor may be stored in the form of a look-up table or may be output from any hardware configuration that implements a relationship function between the aperture ratio and the aperture ratio compensation factor.

By applying the aperture ratio compensation factor to input image data, the deviation of the lifetime curve depending on the difference in aperture ratio may be compensated at S300. In some exemplary embodiments, a stress compensation weight for compensating a luminance drop depending on use may be applied to the image data. Therefore, the magnitude of the data voltage corresponding to the image data may be adjusted according to the aperture ratio. The aperture ratio compensation factor may be additionally applied to the image data so that the lifetime curve deviation due to the aperture ratio deviation may be compensated.

Since the specific method of determining the aperture ratio compensation factor and the method of compensating the image data are described above referred to FIGS. 1 to 12B, repeated descriptions thereof will be omitted to avoid redundancy.

As described above, a display device and a method for compensating image data of the same according to exemplary embodiments may apply the aperture ratio compensation factor for compensating the aperture ratio deviation to the compensation data, so that the lifetime deviation may be uniformly improved and lifetime curves may be adjusted to correspond to a target lifetime curve. In addition, the application of the afterimage compensation (degradation compensation) algorithm based on the luminance drop may be facilitated.

The inventive concepts described herein may be applied to any display device and any system including the display device. For example, the inventive concepts may be applied to a television, a computer monitor, a laptop, a digital camera, a cellular phone, a smart phone, a smart pad, a personal digital assistant (PDA), a portable multimedia player (PMP), a MP3 player, a navigation system, a game console, a video phone, etc. The inventive concepts may be also applied to a wearable device.

According to exemplary embodiments, a degradation compensator may calculate a compensation factor according to a distance between adjacent sub-pixels. In addition, a display device according to exemplary embodiments may compensate image data by applying an aperture ratio compensation factor to compensation data. Exemplary embodiments also provide a method for compensating image data of the display device by calculating the aperture ratio compensation factor.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A degradation compensator, comprising:

a compensation factor determiner configured to determine a compensation factor based on an aperture ratio between adjacent sub-pixels; and a data compensator configured to apply the compensation factor to a stress compensation weight to generate compensation data for compensating image data, wherein the compensation factor decreases as a distance between the adjacent sub-pixels increases, and wherein the compensation factor determiner is configured to determine the compensation factor using a lookup table comprising a relationship of the distance between the adjacent sub-pixels and the compensation factor.

2. The degradation compensator of claim 1, wherein the distance between the adjacent sub-pixels is a shortest distance between a first side of a first sub-pixel and a second side of a second sub-pixel facing the first side of the first sub-pixel.

3. The degradation compensator of claim 2, wherein the distance between the adjacent sub-pixels is a width of a pixel defining layer, the pixel defining layer defining the first side of the first sub-pixel and the second side of the second sub-pixel by being formed between the first sub-pixel and the second sub-pixel.

4. The degradation compensator of claim 2, wherein the first sub-pixel and the second sub-pixel are configured to emit light of the same color.

5. The degradation compensator of claim 2, wherein the first sub-pixel and the second sub-pixel are configured to emit light of different colors.

6. The degradation compensator of claim 1, further comprising:

a stress converter configured to accumulate the image data each corresponding to each of the adjacent sub-pixels to calculate a stress value, and generate the stress compensation weight according to the stress value; and a memory configured to store at least one of the stress value, the stress compensation weight, and the compensation factor.

7. A display device, comprising:

a display panel comprising a plurality of pixels each having a plurality of sub-pixels;

a degradation compensator configured to generate a stress compensation weight by accumulating image data, and generate compensation data based on the stress compensation weight and an aperture ratio of the pixels; and a panel driver configured to drive the display panel based on image data applied with the compensation data, wherein the panel driver is configured to output a data voltage of different magnitudes for the same image data to the display panel according to the aperture ratio, wherein the degradation compensator comprises:

a compensation factor determiner configured to determine an aperture ratio compensation factor based on the aperture ratio of the sub-pixels; and a data compensator configured to apply the aperture ratio compensation factor to the stress compensation weight to generate the compensation data, wherein the aperture ratio compensation factor decreases as a distance between adjacent sub-pixels increases, and wherein the compensation factor determiner is configured to determine the compensation factor using a lookup table comprising a relationship of the distance between the adjacent sub-pixels and the compensation factor.

8. The display device of claim 7, wherein the aperture ratio compensation factor decreases as the aperture ratio increases.

9. The display device of claim 8, wherein the compensation factor determiner is configured to determine the aperture ratio compensation factor using a lookup table comprising a relationship of the aperture ratio of the pixels and the aperture ratio compensation factor.

10. The display device of claim 8, wherein the compensation factor determiner is configured to determine the aperture ratio compensation factor based on a difference between the aperture ratio of the pixels and a predetermined reference aperture ratio.

11. The display device of claim 7, wherein the degradation compensator further comprises a memory configured to store the aperture ratio compensation factor corresponding to the aperture ratio.

12. A method for compensating image data of a display device, the method comprising:

calculating a distance between adjacent sub-pixels using an optical measurement;

determining an aperture ratio compensation factor corresponding to the distance between the adjacent sub-pixels; and compensating a deviation of a lifetime curve according to a difference of the aperture ratio by applying the aperture ratio compensation factor to compensation data, wherein the aperture ratio compensation factor decreases as the distance between the adjacent sub-pixels increases, and wherein the compensation factor determiner is configured to determine the compensation factor using a lookup table comprising a relationship of the distance between the adjacent sub-pixels and the compensation factor.

13. The method of claim 12, wherein:

the distance between the adjacent sub-pixels is a width of a pixel defining layer, the pixel defining layer defining a first side of a first sub-pixel and a second side of a second sub-pixel by being formed between the first sub-pixel and the second sub-pixel; and the width of the pixel defining layer is a shortest length between the first side of the first sub-pixel and the second side of the second sub-pixel.

* * * * *